H. B. ROSS.
GEARING.
APPLICATION FILED JULY 28, 1913.
1,238,198.
Patented Aug. 28, 1917.
5 SHEETS—SHEET 3.
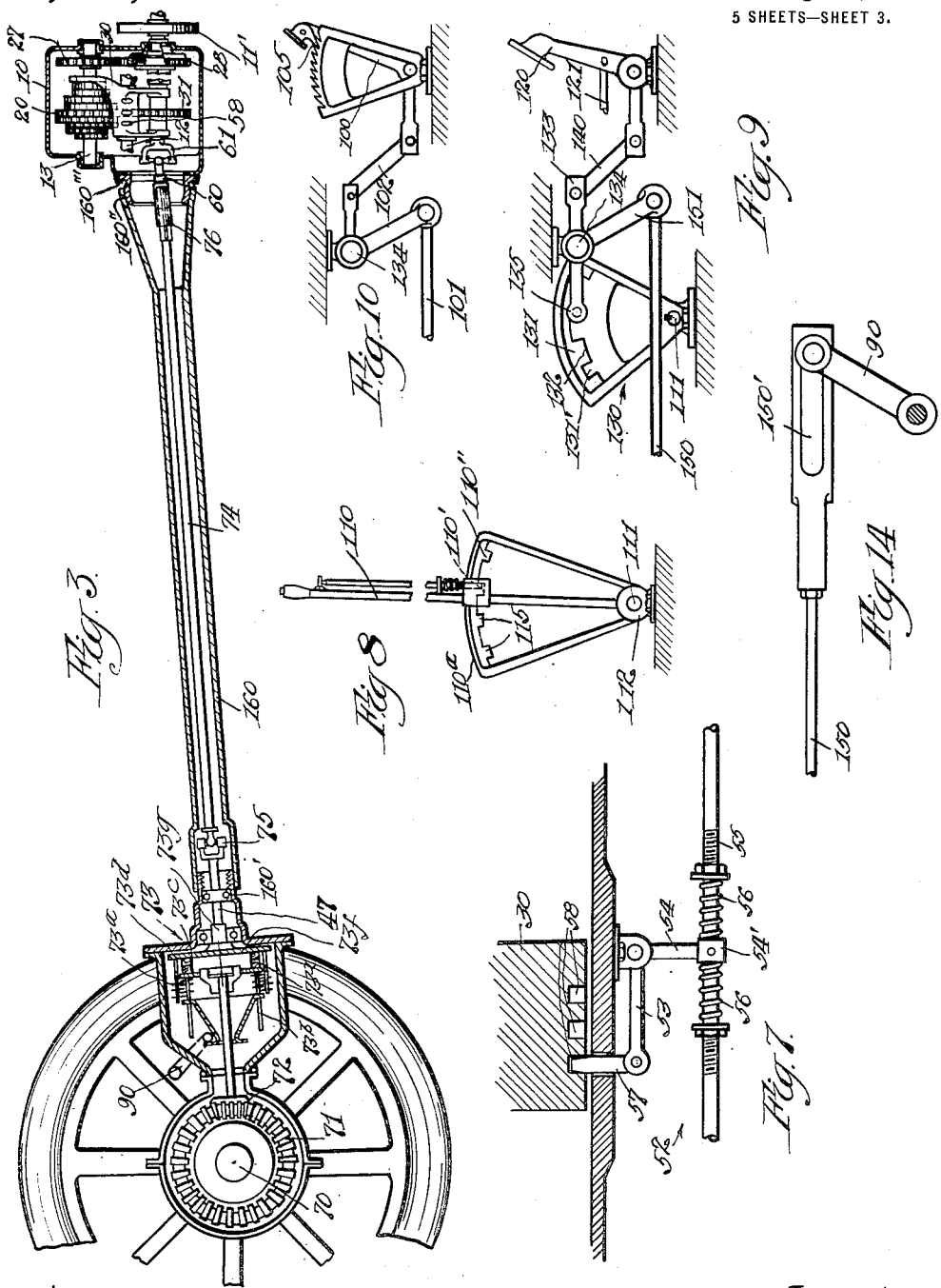
Witnesses
Valois E. Messier
Arthur W. Nelson
Inventor
Harry B. Ross
by [signature]
Attorney H. B. ROSS.
GEARING.
APPLICATION FILED JULY 28, 1913.
1,238,198.
Patented Aug. 28, 1917.
5 SHEETS—SHEET 4.
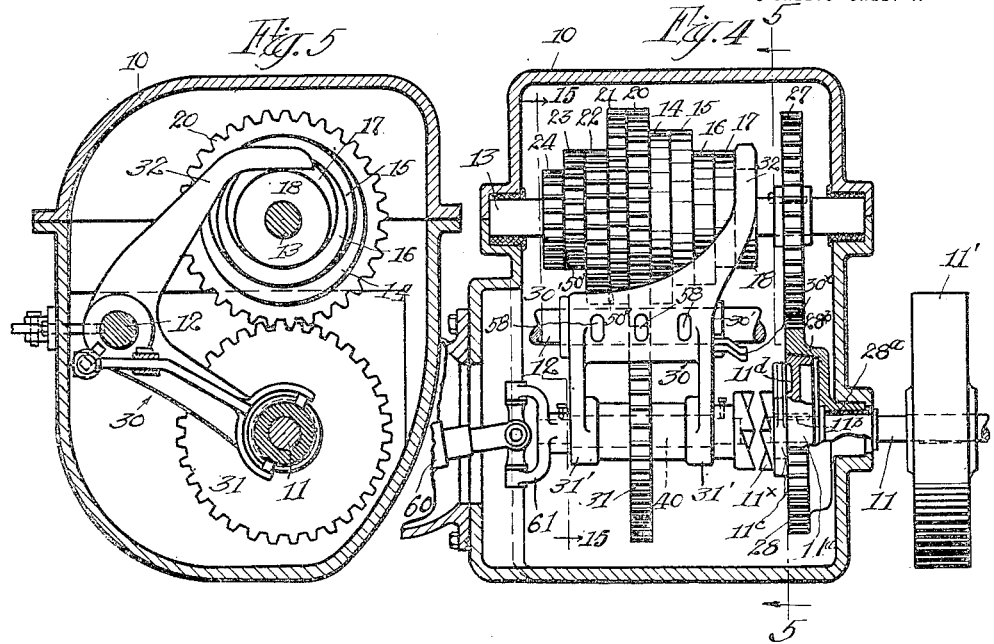
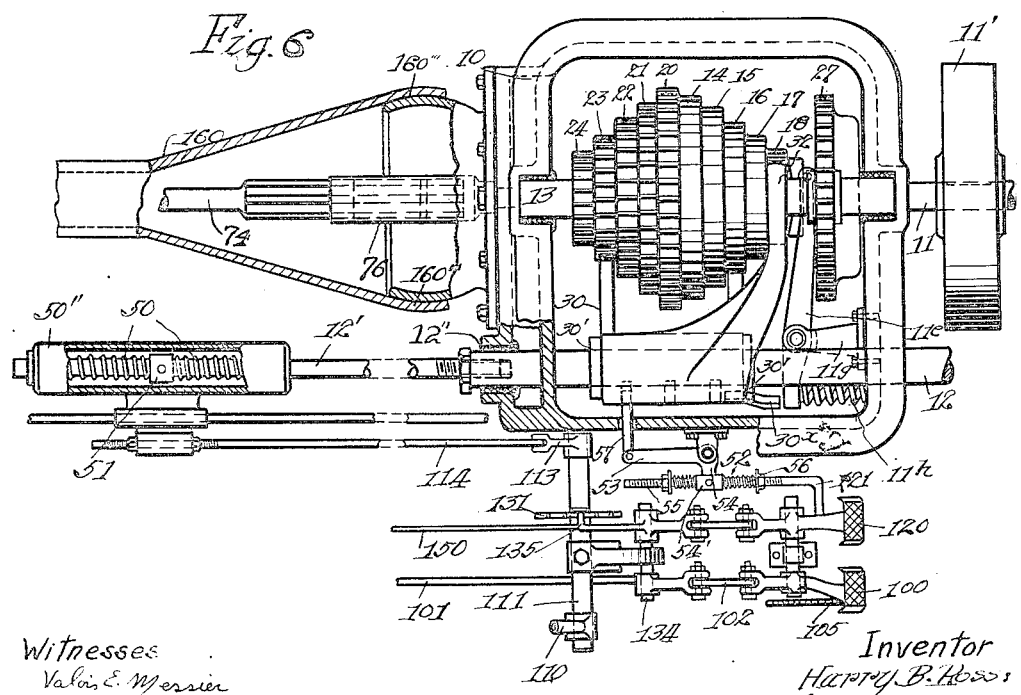
Witnesses
Valois E. Messier
Arthur W. Nelson
Inventor
Harry B. Ross
by Charles Hoff Hurley
Attorney.

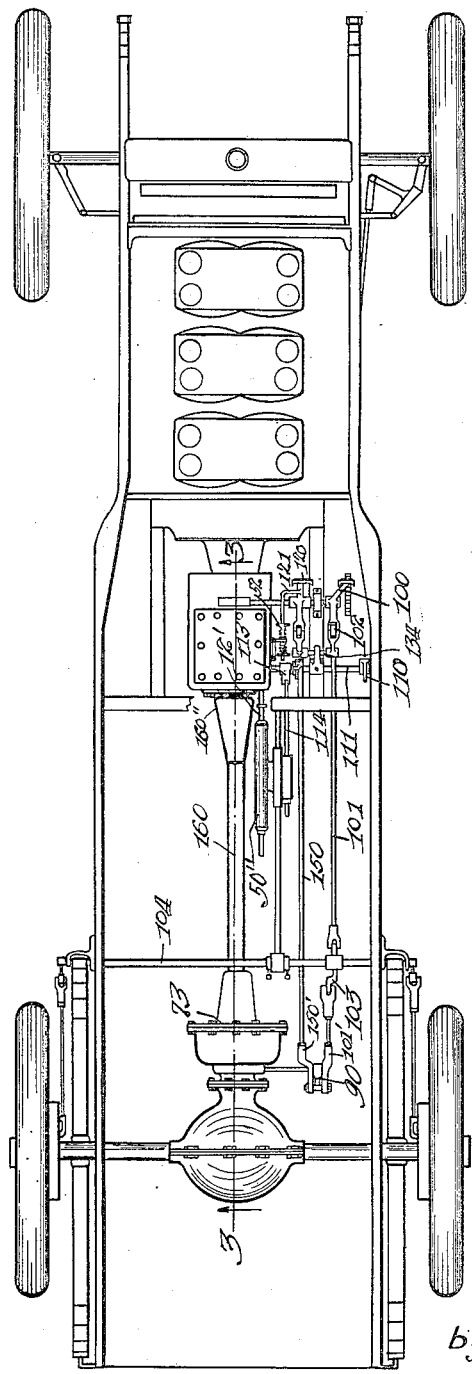

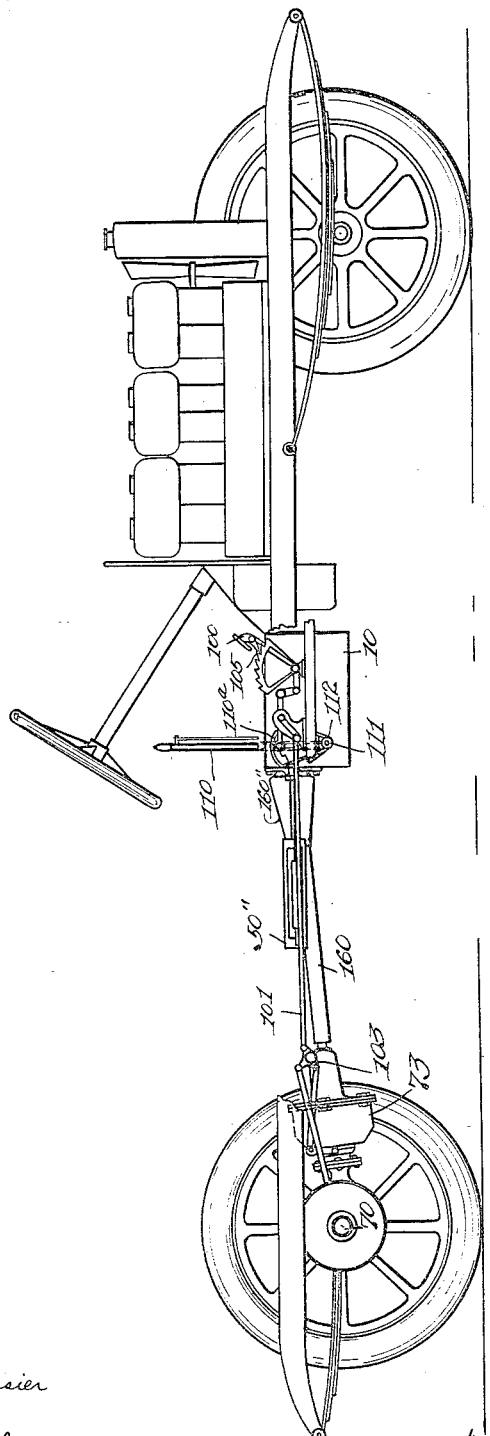

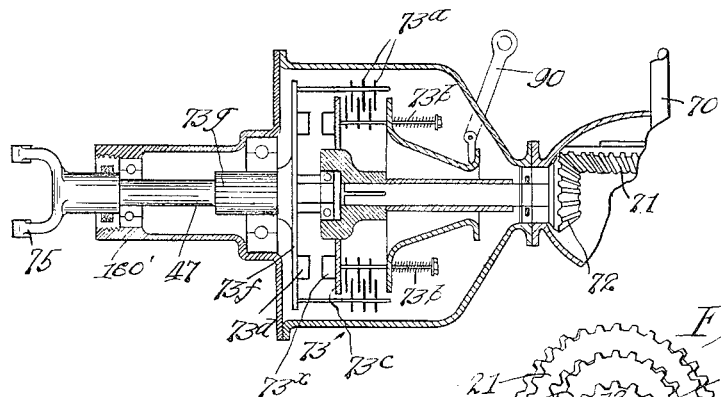
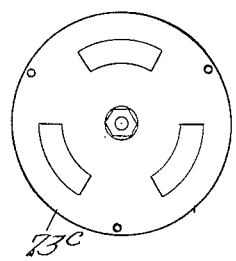
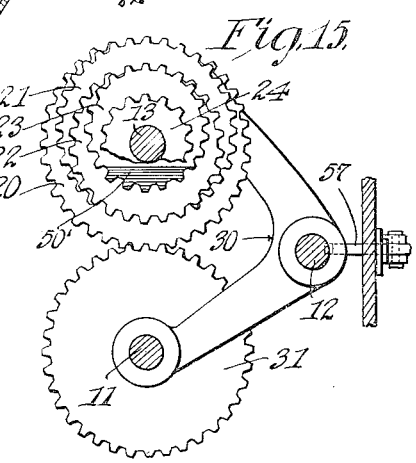
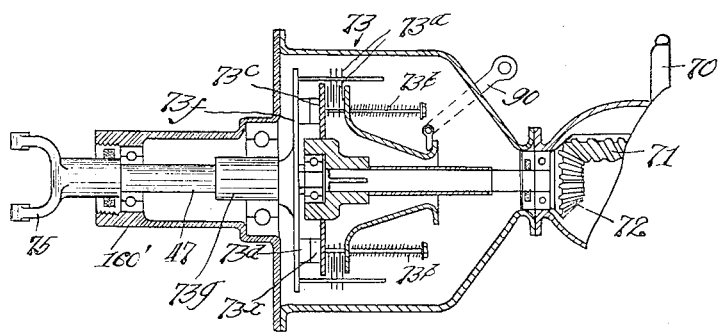

UNITED STATES PATENT OFFICE.

HARRY B. ROSS, OF DETROIT, MICHIGAN, ASSIGNOR TO THE ROSS TRANSMISSION GEAR COMPANY, OF DENVER, COLORADO, A CORPORATION OF COLORADO.

GEARING.

1,238,198.  Specification of Letters Patent.  Patented Aug. 28, 1917.

Application filed July 28, 1913. Serial No. 781,595.

*To all whom it may concern:*

Be it known that I, HARRY B. ROSS, a citizen of the United States, and a resident of Detroit, county of Wayne, and State of Michigan, have invented certain new and useful Improvements in Gearing, of which the following is a specification.

My invention relates generally to the construction of automobiles and has particular reference to the means for transmitting motion from the engine to the driving axle.

The object of my invention is to provide an automobile in which the speed can be easily regulated and controlled by even an unskilled operator, and without danger of stripping the gears.

A further object of my invention is to simplify the automobile construction, and particularly the mechanism for transmitting motion from the engine to the driving axle.

Another object of my invention is to provide controlling mechanism for the speed changing mechanism, clutch, and brakes which is simple in construction and operation.

My invention consists generally in an automobile comprising a motor, a speed-changing transmission mechanism connected thereto, a driving axle and clutch interposed between the driving axle and the transmission mechanism and adapted to connect and disconnect the transmission mechanism and driving axle.

My invention consists further in an automobile comprising a motor, a speed-changing transmission mechanism connected thereto, a driving axle, means coupling the driving axle to the transmission mechanism, a clutch interposed in said means and a controlling device for operating the clutch and shifting the transmission mechanism from one speed to another.

My invention consists further in an automobile comprising a motor, speed changing transmission gearing connected thereto, a driving axle, means connecting the driving axle and the transmission mechanism, a clutch arranged in said connecting means, and three controlling devices, one formed and adapted to operate the clutch and brake, another to operate the gear shaft, and another to operate the gear safety device and clutch.

My invention consists still further in the unique arrangement, construction and cooperation of parts whereby those objects named above and others which will appear hereinafter are attained.

My invention will be more readily understood by reference to the accompanying drawings, illustrating the preferred form of my invention, and in which:

Figure 1 is a plan view of an automobile constructed in accordance with my invention;

Fig. 2 is a side elevation thereof, with parts of the frame broken away, to show the operating parts;

Fig. 3 is a central section substantially on the line 3—3 of Fig. 1;

Fig. 4 is an enlarged view of the variable speed gear transmission mechanism shown in Fig. 3;

Fig. 5 is a view substantially on the line 5—5 of Fig. 4;

Fig. 6 is a plan view of the gearing with the cover of the gear box removed and also showing the contiguous operating levers;

Fig. 7 is an enlarged detail view of the locking device for the shiftable member of the transmission gearing;

Fig. 8 is a detailed view of the transmission gear shifting lever;

Fig. 9 is a detail view of the foot lever for operating the locking device of Fig. 7 and also for operating the clutch;

Fig. 10 is a detail view of the clutch and brake operating lever.

Figs. 11, 12 and 13 are detailed views of the rear axle clutch; and,

Fig. 14 is a detail view showing the construction of the end portion of the clutch operating rods.

Fig. 15 is a detailed view substantially on the line 15—15 of Fig. 4, a portion of the gearing being broken away to disclose the beveled face on the eccentric gear.

The automobile as hitherto almost universally constructed has the engine at the forward end, then follows the transmission mechanism, which is connected by a shaft and gearing to the rear axle or the jackshaft, depending upon whether or not the car is of the chain driven type or the gear driven type. The clutch is arranged between the engine and the transmission mechanism. When the transmission mechanism is to be shifted from one speed to another, the engine clutch is pulled out, but the transmission mechanism is always connected to the rear axle or drive shaft. With this construction the engine may operate without operating the transmission mechanism and if the car is moving the rear axle will turn the transmission gearing sufficiently to permit the proper selection of the gears. The disadvantage of this construction is that there is a drag on the transmission mechanism by virtue of its connection with the rear axle which makes it difficult to shift the gears. I obviate this difficulty by providing a unique type of transmission mechanism, which is well adapted to shift when operated by the engine. I also arrange the clutch between the transmission mechanism and rear axle and provide means for throwing out the clutch when the gear is to be shifted. In this manner I provide a perfectly free shifting transmission gearing.

In order to facilitate the description and understanding of my invention, I shall first give a brief description of my transmission mechanism.

The transmission gearing comprises generally a casing 10 in which are mounted three shafts 11, 12 and 13. The shaft 11 connects directly to the engine, the fly-wheel of which is indicated at 11'; without the interposition of a clutch of any kind, and, therefore, revolves continuously while the engine is in motion. The shaft 13 is rotatably mounted in the upper portion of the casing and carries a number of concentric cams 14, 16 and 18, between which are interposed eccentric cams 15 and 17. The shaft 13 also carries a number of similar concentric gears 20, 22 and 24, between which are arranged eccentric gears 21 and 23. All these gears and cams are fixed to rotate with shaft 13. The shaft 13 also carries a gear 27 which is preferably of the same size as the gear 28 mounted upon the engine shaft 11; it is fixed to the shaft 13 and meshes with the gear 28. In this manner motion is imparted to the shaft 13. I mount a bell crank 30 upon the shaft 12 and fix it to rock thereon, but hold it against longitudinal movement on the shaft by collars 30'. The bell crank, as is well shown in Fig. 5, carries a master gear 31 for engagement with the gears on the shaft 13, and has its upper portion 32 in engagement with the cams on the shaft 13. In the position shown in the drawings, the master gear 31 is in engagement with the largest of the concentric gears and is maintained in such position by the engagement of the bell crank 30 with the concentric cam 18. The gear 31 is suitably mounted in the bell crank 30 by a small shaft 40, rotatably carried in the bearing portions 31' thereof.

By this mechanism motion is imparted to the shaft 40. To change the speed of the shaft 40 it is but necessary to shift the gear 31 into engagement with such of the other gears of the pyramid as will give the desired speed. The gear 31 and shaft 40 are relatively light and can be shifted with little power. To shift the gear 31 from one gear to the other it is but necessary to compress the spring 50, arranged on the extended end portion 12' of the shaft 12, the shaft 12 being slidable in its bearings 12". By compressing one of the springs 50 on the proper side of the block 51, the gear can be shifted in either direction. The gear 31 can only properly shift from one to the other of the pyramid when the concentric gear and the next larger or smaller eccentric gears have several of their teeth in alinement, and, therefore, to prevent the spring 50 from moving the gear at the wrong time, I use a safety locking device 52. The details of this locking device are shown and described in my allowed application, Serial No. 697,862, and will be described only briefly to enable a proper understanding thereof.

The locking device, as best shown in Figs. 6 and 7, comprises a bell crank 53 having an arm 54 slidably engaging a rod 55 upon which compression springs 56 are mounted, one on each side of the end portion 54'. A finger 57 is carried on the other end of the bell crank and enters one of the holes 58 provided therefor in the bell crank 30 of the gearing. The eccentric gears are provided with beveled portions 50'. The beveled portions 50' on the eccentric gears allow the bell crank arm 53 and gear 31 carried thereby a slight movement in the direction of the shift and at the place of the shift, when the spring 50 has been compressed. Since the finger 57 is in one of the holes, 58, the bell crank carrying the gear 31 does not shift until the finger 57 is pulled free of the hole. By virtue of the beveled portions 50' the gear 31 will move enough to bind the finger 57 in the hole 58, and thus the finger 57 cannot be pulled out of the hole 58 by the compressed spring 56 to allow the gear 31 to shift on to an eccentric until the beveled portion has thrown the gear 31 back to a normal position on a true speed gear as for example 24, thus preventing a late shift of the gear 31 from a concentric to an eccentric gear. The shifting of the gear by the beveled portion permits the spring 56 to withdraw the finger 58, so that the gear 31 is ready to shift the instant the shifting portion of the gears is again reached.

The stud shaft 40, carried by the bell crank, is connected to a short shaft 60 by a universal joint 61. It is necessary to communicate the motion of the shaft 40 to the rear or driving axle 70, and this I do in a unique way. The driving axle is provided with the usual bevel gearing 71 and 72. The gear 72 instead of being connected to a shaft leading directly to the transmission gearing as in automobiles hitherto constructed is connected to a clutch 73 which serves to connect and disconnect the gear and shaft 47 extending to the transmission gearing. As there will be relative movement between the transmission gearing and the driving axle of the automobile in use, I provide the universal joint 75 to connect the shaft 74 to the clutch. I also provide slip joint 76 to take care of the shortening of the shaft 74 caused by the relative vertical movement of the transmission and the axle and also the substantially longitudinal movement of the shaft 40 to which the short shaft 60 is connected.

I prefer to incase the connecting rod 74 to prevent the dust and dirt getting into the transmission gearing or into the members of the clutch. For this purpose I provide a substantially cylindrical casing 160 which slidably engages the end portion 160' of the clutch casing and which has a curved end portion 160'' for complementary engagement with the ball like member 160''' of the gear casing. This construction permits the casing readily to assume any necessary and angular position. By this unique mechanism I am able to transmit variable speed motion from the engine to the rear axle.

The motor of the automobile is usually constructed of such relative power that it is possible to drive under ordinary circumstances directly without any speed reduction. For this reason I construct my transmission so that a direct drive can easily be accomplished, and my unique construction making this possible will be most readily understood by reference to Figs. 4, 5 and 6.

I extend the shaft 11 into the casing beyond the gear 28 forming an end portion 11$^a$, and on this extended portion I mount by a feather 11$^b$ a double male clutch member 11$^c$ having preferably a cone clutch portion 11$^d$ and a jaw clutch portion 11$^x$. The gear 28 rides loosely on the shaft 11 and also has a bearing portion 28$^a$ in the transmission casing. I also provide the gear 28 with a female clutch portion 28$^b$ for complementary engagement with the cone 11$^d$. The cone 11$^d$ is normally held in engagement with the gear and thereby fixing it to rotate with the shaft 11, by the spring pressed arm 11$^e$. The arm 11$^e$ is pivotally held in a bracket 11$^g$ which is affixed to the gear casing. Obviously the spring 11$^h$, interposed between the end of the lever and the bracket, serves to hold the cone clutch in engagement with the gear. For the purpose of withdrawing the cone clutch and freeing the gear 28, I provide an extension 30$^x$ of the bell crank which strikes the lever so soon as the bell crank moves to the right beyond the position shown. I also provide a clutch member on the shaft 40 to receive the arm member 11$^e$. Hence when the spring 50 is compressed to move the bell crank 30, but slight movement thereof withdraws the cone clutch from the gear 20 and couples the jaw clutch. A direct drive from the engine to the rear axle is thereby established. The movement of the bell crank is so slight that the gear 31 is never withdrawn entirely from the large gear 20 of the pyramid. Therefore, there is no clash in returning to the speed reducing position.

As before stated, with this type of transmission mechanism, it is particularly desirable to have the shifting gear free from the rear axle or driving axle when the gear is to be shifted. This is one important reason why I arrange the clutch 73 between the rear axle and the transmission mechanism and provide means to draw out the clutch just before the gear 31 is to be shifted. Various types of clutches may be used but I prefer one which gradually picks up and releases the load. I have shown a clutch of the multiple disk type. Briefly this clutch comprises a number of disks 73$^a$ and springs 73$^b$ acting to hold same together. The springs 73$^b$ ultimately press the disks 73$^c$ carrying lugs 73$^x$ into engagement with the lugs 73$^d$ carried by a member 73$^f$, carried by the stud shaft 73$^g$. A lever 90 is provided for controlling the clutch and by moving it in one direction the clutch can be thrown in and by moving it in another the clutch can be pulled out.

In order that unskilful drivers may operate the car, that the gearing may not be damaged in shifting from one speed to another, and for other reasons, it is desirable that a simple control system be provided. I have provided a very simple and unique control which may be operated by even an unskilled person and whereby the gearing cannot possibly be damaged, and which has other desirable features which will appear from the following detail description.

*Mechanism for stopping the car.*

For this purpose I provide a foot lever 100 which, by connecting rods 101 and 102 and lever 103, is connected to the lever 90. The bell crank lever 103 is mounted on the brake shaft 104, hence any movement of the lever 100 rocks the brake shaft 104 and either throws on or releases the brakes. The same movement of the lever also throws the clutch in or out. I also provide a suitable pawl and ratchet 105 to lock the foot pedal in desired position. It will be seen, therefore, that the automobile may be started or stopped by simply pressing the foot lever 100.

*Mechanism for changing the speed of the car.*

For this purpose I provide a hand lever 110 mounted upon the shaft 111, which shaft is rotatably mounted in suitable bearings 112. The shaft 111 carries a lever 113 which in turn is connected by a rod 114 to the housing 50'' surrounding the gear operating springs 50. It is obvious that movement of the shaft 111 will serve to compress one of the springs 50 depending upon the direction of rotation of the shaft. In order that the spring may be put under proper tension I arrange a quadrant 110ª on the shaft 111 (see Fig. 8), containing a number of slots 115 corresponding in number to the number of speeds of the transmission mechanism. By shoving the lever 110 to the proper slot, the gear 31 can be shifted from one gear to the other, and also to the direct drive position. As before stated it is desirable and necessary to prevent the gear 31 from shifting excepting when certain of the teeth on the adjoining gears are in alinement, and I described briefly one suitable mechanism for this purpose. To actuate this mechanism I provide a foot lever 120 to which is secured a rod 121, extending to the safety locking mechanism. In order that the safety mechanism cannot be actuated except when the spring 50 is ready to shift the gear, I provide a safety lock 130. This is a quadrant (see Fig. 9), arranged on the shaft 111 and fixed to rock therewith. It contains a groove 131 and a number of depressions 132 corresponding to the slots of the hand lever quadrant. A lever 133 mounted on a short rock shaft 134, has an end portion 135 which normally enters the groove 131. It is connected to the foot lever 120 by the link 140. The lever 133 is prevented from downward movement by the portions 131', except when the end portion 135 is in alinement with one of the depressions 132. Therefore, the foot lever 120 cannot be moved except when the lock 130 is in the proper position, and as this is controlled by the gear shifting lever 110, it should be obvious that a complete safety device is thereby provided. As before stated, one of the objects of my invention is to enable the gear to be freely shifted and for this purpose it is desirable to disconnect the gear from the rear axle so that there be no drag from that source. I, therefore, provide a connecting rod 150 which connects the clutch operating lever 90 with a lever 151, carried on the rock shaft 134, which in turn is controlled by movement of the foot pedal 120.

The shifting operation is as follows, assuming the gear 31 to be in mesh with the largest of the gears, as indicated in the drawings, the hand lever 110 is moved from engagement with the slot 110' to the slot 110'' and thereby compressing the spring 50, tending to shift the gear. The gear cannot shift, however, because of the engagement of the finger 57 with the bell crank. The foot pedal 120 is then moved forward thereby throwing out the clutch and compressing the spring 56 of the locking device. Because of the pressure of the spring 50, however, tending to bind the finger against withdrawal when the parts are in improper shifting relation, the spring 56 does not immediately act, but the bevel portions 50' of the eccentric gears slightly move the master gear and the pin or finger is freed, whereupon the spring 56 acts to withdraw the finger thereby permitting the spring 50 to shift the master gear to the next shifting position. The foot pedal 120 may then be permitted to return to its position throwing in the clutch and permitting the safety device to return into engagement with the other of the holes 58. With my construction there is absolutely no possibility of stripping the gears or of shifting at the wrong time, nor of shifting while the clutch is in.

In order that either of the pedals 100 or 120 may be moved to operate the clutch, without affecting the other, I slot the end portion 101' and 150' of the connecting rods 101 and 150, as shown in Fig. 2, to permit free movement thereof.

It should be obvious from the description herein given that the objects outlined in the opening of the specification are obtainable by the mechanism shown, but since I can readily conceive of various modified forms whereby the substantial objects of my invention may be attained, and because others skilled in the art will also conceive of the various modified structures, I do not wish to limit myself to the specific construction shown and described except as may be necessary by express limitations in the claims hereunto appended.

I claim:

1. In an automobile, the combination of a motor, transmission gear mechanism connected thereto, a driving axle, a clutch interposed between the driving axle and the transmission mechanism, a lever and resistance for storing energy to shift the transmission mechanism parts, a shift governing device for governing the movement of the transmission mechanism parts, and a lever for operating the clutch and for operating the shift-governing device to permit said stored energy to act to change the speed relation of the transmission mechanism parts.

2. In mechanism of the class described, the combination of a motor, transmission gear mechanism, having a shiftable gear element, a driving axle, means connecting the motor, transmission gear mechanism, and driving axle, said means including a clutch, a lever and resistance operable to store force for shifting said shiftable gear element, and a shift governing device governing the movement of said shiftable element.

3. In mechanism of the class described, the combination of a motor, transmission gear mechanism having a shiftable gear element, a driving axle, means connecting the motor and transmission mechanism, a clutch and shaft connecting the transmission mechanism and the driving axle, a lever and resistance operable to store energy for shifting said shiftable gear element, a device for locking the shiftable element against movement, and a lever and resistance for storing energy to release said lock and to permit said stored energy to shift the shiftable gear element.

4. In mechanism of the class described, the combination of a motor, transmission gear mechanism having relatively shiftable coöperating gears, a driving axle, means connecting the transmission mechanism driving axle and motor, said means including a clutch, means operable to store force for relatively shifting the transmission gears, means for actuating the clutch, and a locking device governing the stored energy and the shifting of the transmission gears.

5. In mechanism of the class described, the combination of a motor, transmission mechanism connected thereto, a driving axle, a clutch interposed between the driving axle and the transmission mechanism, mechanism for shifting the gear parts of the transmission mechanism and comprising a double compression spring, a lever for compressing same, a safety device locking the gear parts against movement, and spring actuated means for unlocking said gear locking device.

6. In an automobile, the combination of a motor, transmission gear mechanism connected thereto, a driving axle, a clutch for connecting and disconnecting the driving axle to the other parts, a brake mechanism, a lever for operating the brake and actuating the clutch, a lever and resistance for storing force for shifting the gear parts of the transmission mechanism and a lever and resistance for actuating the clutch and for storing energy to actuate a gear shift governing device.

7. In an automobile, the combination of a motor, a transmission gear mechanism connected thereto, a driving axle, a clutch interposed between the driving axle and the transmission mechanism, said transmission mechanism comprising a pyramid of change speed gears and a single shiftable gear for coöperation therewith, means connecting said shiftable gear to the clutch and means for moving the shiftable gear to various speed positions.

8. In an automobile, the combination of a motor, a transmission gear mechanism connected thereto, a driving axle, a clutch interposed between the driving axle and the transmission mechanism, said transmission mechanism comprising a pyramid of change speed gears, and a single shiftable gear for coöperation therewith, means connecting said shiftable gear and clutch, and means operable first to disconnect the clutch and then to shift said gear to proper speed position.

9. In an automobile, the combination of a motor, a transmission gear mechanism connected thereto, a driving axle, a clutch interposed between the driving axle and the transmission mechanism, said transmission mechanism comprising a pyramid of change speed gears and a single shiftable gear for coöperation therewith, means connecting said shiftable gear to the clutch, means for moving the shiftable gear to various speed positions, and mechanism for locking the shiftable gear in its different speed positions.

10. In an automobile, the combination of a motor, transmission gear mechanism directly connected thereto, a driving axle, and a clutch interposed between the transmission mechanism and driving axle, said transmission mechanism having a shiftable gear adapted to move to different speed positions, and a slip joint between said clutch and transmission mechanism to permit a driving connection in the different speed positions.

11. In an automobile, the combination of a motor, transmission gear mechanism, and a driving axle, said transmission mechanism comprising a pyramid of change speed gears and a single shiftable gear coöperable therewith, means including a slip joint for connecting the shiftable gear to the engine and to the driving axle.

12. In an automobile, the combination of a motor, a transmission mechanism connected thereto, a driving axle, a telescopic shaft connecting the driving axle and the transmission mechanism and a spherically jointed casing extending between the transmission mechanism and the driving axle and inclosing said shaft.

13. In an automobile, the combination of a motor, transmission gear mechanism connected thereto, a driving axle, a telescopic shaft connecting the transmission mechanism and driving axle, a clutch interposed in said shaft adjacent the driving axle, said transmission mechanism comprising change speed gears, a shiftable master gear and means for maintaining same in engagement with the speed changing gears and a universal joint connection between the shiftable master gear and said telescopic shaft.

14. Mechanism of the class described, comprising in combination a motor, a transmission mechanism, a driving axle, said transmission mechanism comprising a pyramid of change speed gears and a single gear carried solely on a shiftable shaft by means of an arm attached thereto, and a universal jointed connection between the single gear and the driving axle and means for establishing a direct drive from the engine to the single gear.

In testimony whereof, I have hereunto set by hand this 22nd day of July, 1913, in the presence of two subscribing witnesses.

HARRY B. ROSS.

Witnesses:
 EUGENE G. DONOHOE,
 MAX KAHN.